United States Patent [19]
Yip et al.

[11] 4,454,547
[45] Jun. 12, 1984

[54] RASTER OUTPUT SCANNER HAVING A FULL WIDTH ELECTRO-MECHANICAL MODULATOR

[75] Inventors: Kwok L. Yip, Webster, N.Y.; To R. Hsing, Sudbury, Mass.; Joseph J. Daniele, Pittsford; Joachim A. Ritter, Webster, both of N.Y.

[73] Assignee: Xerox Corporation, Stamford, Conn.

[21] Appl. No.: 394,603

[22] Filed: Jul. 2, 1982

[51] Int. Cl.$^3$ .............................................. H04N 1/24
[52] U.S. Cl. .................................. 358/293; 358/300; 358/302
[58] Field of Search ................ 358/293, 296, 300, 302

[56] References Cited

U.S. PATENT DOCUMENTS

| | | | |
|---|---|---|---|
| 3,746,911 | 7/1973 | Nathanson et al. | 315/21 R |
| 4,087,810 | 5/1978 | Hung et al. | 340/324 M |
| 4,110,796 | 8/1978 | Aughton | 358/302 |
| 4,312,590 | 1/1982 | Harbaugh | 358/293 |

OTHER PUBLICATIONS

IBM TDB (vol. 22, No. 11, Apr. 1980).
IBM TDB (vol. 23, No. 1, Jun. 1980).
IBM TDB (vol. 22, No. 12, May 1980).
"Dynamic Micromechanics On Silicon: Techniques and Devices" (IEEE Transactions, vol. ED.-25, No. 10, Oct. 1978).
"Micromechanical Light Modulator Array Fabricated on Silicon" (APpplied Physics Letters, vol. 31, No. 8, Oct. 15, 1977).
"The Mirror Matrix Tube: A Novel Light Valve for Projection Displays" (Proceeding of the S.I.D., vol. 16/3, Third Quarter 1975).
"Micromechanical Accelerometer Integrated With MOS Detection Circuitry" (CH1616-2/80/0000-0673, 1980 IEEE).
"Silicon Torsional Scanning Mirror" (IBM J. Res. Develop., vol. 24, No. 5, Sep. 1980).
"Silicon as a Mechanical Material" (IEEE Proceedings, vol. 70, No. 5, May 1982).
IBM TDB (vol. 20, No. 1, Jun. 1977).
IBM TDB (vol. 22, No. 5, Oct. 1979).
IBM TDB (vol. 21, No. 3, Aug. 1978).

Primary Examiner—Howard W. Britton
Attorney, Agent, or Firm—Frederick E. McMullen

[57] ABSTRACT

An output scanner for producing images in response to image signals, the scanner having a high intensity illumination lamp, fiber optic bundle for converting the light output of the lamp to a succession of light rays for exposing an imaging member line by line, an electro-mechanical modulator for modulating the light rays individually in response to image signals, and a lens array for transmitting light rays from the modulator to the imaging member. The modulator comprises a full width array of closely spaced finger-like reflectors which deflect upon application of a preset potential thereto, the potential being applied to the reflectors selectively in accordance with an image signal.

12 Claims, 5 Drawing Figures

RASTER OUTPUT SCANNER HAVING A FULL WIDTH ELECTRO-MECHANICAL MODULATOR

The invention relates to image output scanners, and more particularly to an electro-mechanical light modulator for use with image output scanners.

Image output scanners function to generate on a suitable imaging member an image in accordance with image signals. The image signals may be derived for example from a raster input scanner which converts the image of a document original to electrical signals which may then be input either directly, or following storage or transmission for example, to an image output scanner to make duplicate or copies of the document original. The aforesaid imaging member may for example comprise the photoreceptor of a xerographic type image processing system, the image output scanner serving to expose the xerographic system photoreceptor in accordance with the image signals to produce on the photoreceptor a latent electrostatic image. As known to those versed in the xerographic arts, the latent image created on the photoreceptor is thereafter developed by the application of toner, and the toned image transferred to a suitable copy substrate material which may thereafter be fixed as by fusing to provide a permanent image.

While various image output scanner types are known, all operate on the same basic principle. The output of a high intensity light source is modulated in accordance with the image signals representing the image to be reproduced or copied, the modulated beam that results being then directed to the scanner imaging member where the rays of light selectively expose the imaging member to create or write an image line by line. The usual image output scanner typically employs a single relatively narrow high intensity beam of light which normally originates from a laser, with cooperating rotating polygonal mirror to repeatedly sweep the high intensity beam across the width of the photoreceptor of the xerographic system as the photoreceptor moves past the exposure point where the beam strikes the photoreceptor, the photoreceptor being moved either continuously or in a stepped fashion. A modulator such as an acousto-optic type modulator which is interposed astride the path of the high intensity beam, is employed to vary the beam intensity in response to the image signals.

However, image output scanners of the foregoing type are necessarily complex and expensive, particularly in the need to employ a very high intensity light source such as laser, the need to provide a substantial amount of costly circuitry for processing and synchronizing the divergently operating xerographic system and image signal source, and the need to provide some type of scanning element such as a rotating polygon to scan the beam in synchronism with movement of the photoreceptor and receipt of the image signals.

The invention seeks to overcome the foregoing problems and provide a less complex, less expensive image output scanner which comprises, in combination: a source of high intensity radiation; means for converting radiation from the radiation source to a plurality of individual radiation beams; an array of flexible reflectors, the number of reflectors being at least equal to the number of radiation beams, the reflector arrays being disposed in the path of the radiation beams so that individual ones of the radiation beams impinge against individual ones of the reflectors whereby the reflectors individually reflect the radiation beams along a first path when the reflectors are undeflected and along a second path when the reflectors are deflected; an imaging member on which images are created through selective exposure by the radiation beams; a lens array for transmitting individual radiation beams reflected by the reflectors along one of the first and second paths to the imaging member to expose the imaging member and create images thereon; and means to deflect the reflectors individually in response to an image signal input whereby to selectively impinge the radiation beams against the imaging member to expose the imaging member and create images represented by the image signals on the imaging member.

IN THE DRAWINGS

Figure 1:
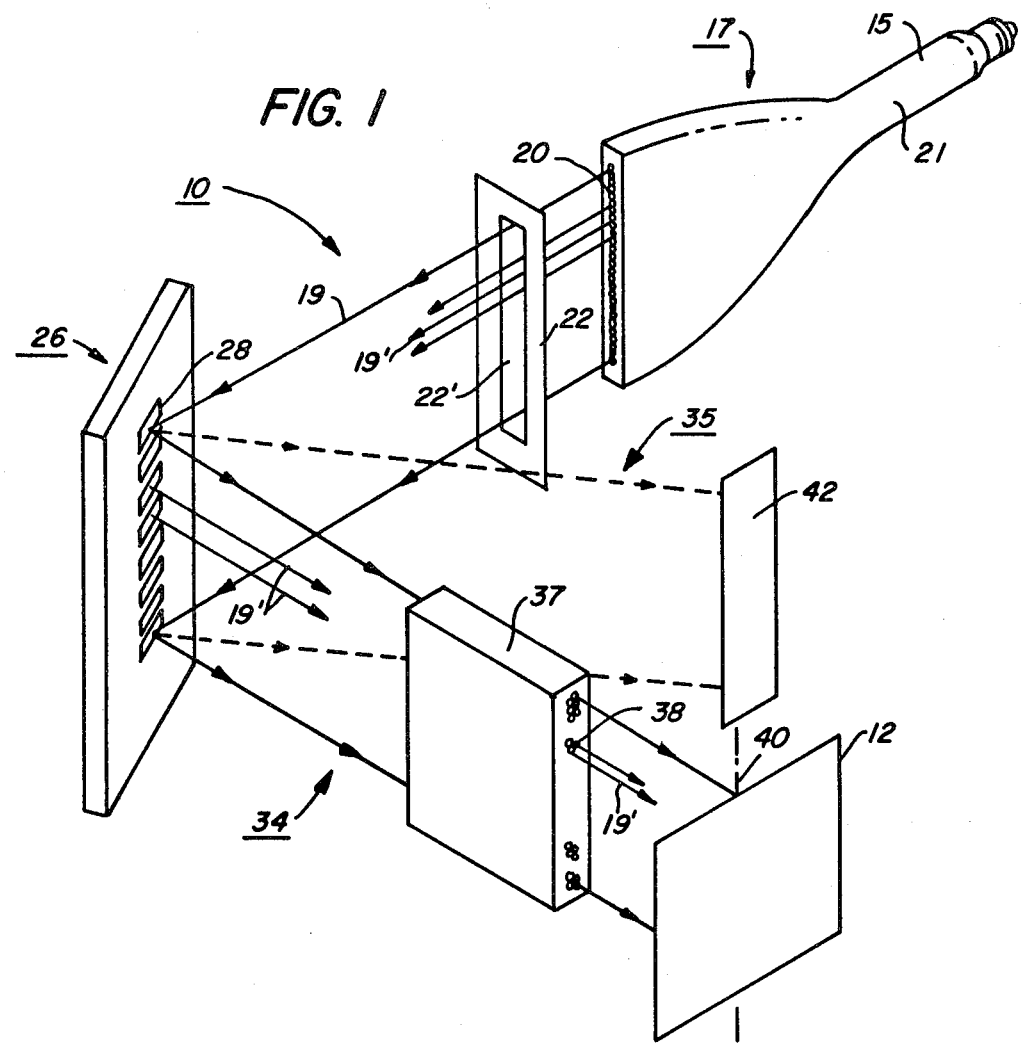
FIG. 1 is an isometric view showing an output scanner with the full width electro-mechanical modulator of the present invention.
Figure 2:
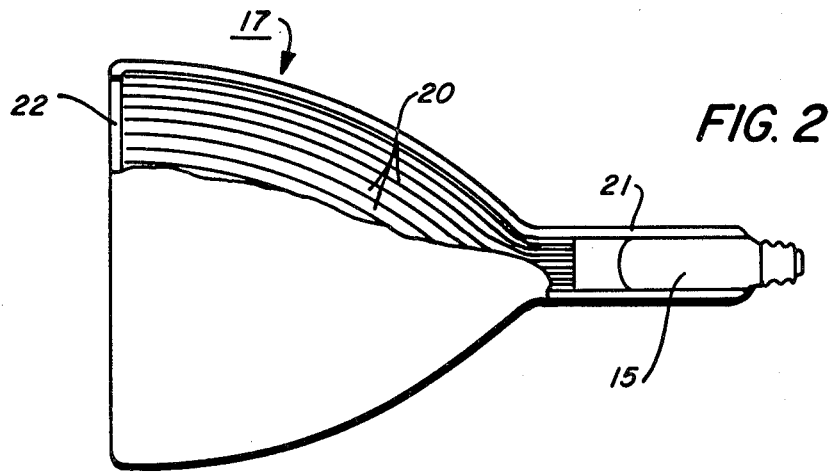
FIG. 2 is an enlarged side view in cross section showing details of the fiber optic bundle of the output scanner shown in FIG. 1.

Referring particularly to FIGS. 1 and 2 of the drawings, the electro-mechanical image output scanner of the present invention, designated generally by the numeral 10, is thereshown. Scanner 10, as will appear more fully herein, serves to expose a suitable imaging member, shown here as the photoreceptor 12 of a xerographic imaging system to create images thereon in accordance with image signals or pixels. Photoreceptor 12 which is illustrated in the form a relatively flat plate-like member, may comprise any suitable photoreceptor material such as selenium and be of any desired shape or configuration such as a belt, drum, etc.

As will be readily understood by those familiar with the xerographic arts, photoreceptor 12 is charged prior to exposure to a uniform charge level by a suitable charging device. Following exposure, the latent electrostatic image created on photoreceptor 12 is developed with a suitable developer, commonly termed toner, which renders the image visible. The developed image is thereafter transferred to a suitable substrate material such as paper, following which the image is fixed as by fusing to form a permanent copy.

A high intensity light such as a tungsten halogen lamp 15 serves as a source of illumination for scanner 10. A round to rectangular fiber optic bundle 17 serves to change the generally circular light beam of lamp 15 to a line-like beam or array 19 of individual light rays 19' for exposing photoreceptor 12 a line at a time as will appear. Fiber optic bundle 17 comprises a plurality of fiber optic elements 20 assembled together to form a unitary structure with the light receiving ends of fiber optic elements 20 being embedded in one end of a hollow epoxy rod 21 to provide a generally round light input side. The light discharge end of lamp 15 is disposed in the opposite end of the rod 21, the respective depths to which the fiber optic elements 20 and lamp 15 are inserted being dependent upon the illumination characteristics desired. Lamp 15 and fiber optic bundle 17 are supported in predetermined fixed position by suitable means (not shown) such that the light beam 19, which as will be understood is composed of a plurality of individual light rays 19' emitted by the individual fiber optic elements 20 that comprise fiber optic bundle 17, is directed against one face of electro-mechanical modulator 26, the individual light rays 19' impinging against individual reflector fingers 28 of modulator 26 at a preset angle. A beam control aperture plate 22 having a light transmitting aperture 22' therethrough of predetermined dimension is disposed astride the path of beam 19 between fiber optic bundle 17 and modulator 26. As will appear, reflector fingers 28 of modulator 26 selectively reflect the light rays impinging thereupon at one of two angles to provide either a zero order beam 34 or a first order beam 35 in accordance with the content of the image signal input to scanner 10.

The light rays 19' that comprise zero order beam 34 at any instant in time are reflected to a gradient index array 37 of fiber lenses, the individual lenses 38 of which serve to guide and focus the individual light rays of zero order beam 34 onto the photoreceptor 12 an imaging station 40. The aforesaid fiber lenses are produced under the trade name "SELFOC", a mark registered in Japan and owned by Nippon Sheet Glass Co., Ltd. As will be understood, the number of individual reflector fingers 28 that comprise modulator 26 is determinative of the image resolution, the number of fiber elements in fiber optic bundle 17 and lens array 37 in turn being equal to the number of reflector fingers 28 that comprise modulator 26. Lens array 37 is supported by suitable means (not shown) in predetermined fixed relationship to modulator 26 and the individual reflector fingers 28, and to photoreceptor 12 and imaging station 40.

A beam stop 42 which is comprised of any suitable light impervious or absorbing material is interposed in the path of first order beam 35.

Figure 3:
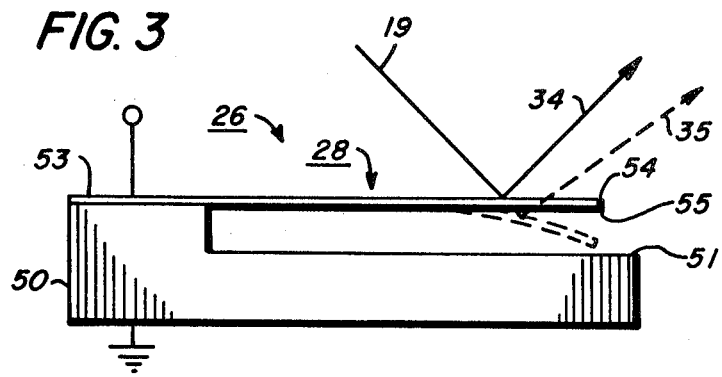
FIG. 3 is an enlarged side view in cross section showing details of the electro-mechanical modulator construction.
Figure 4:
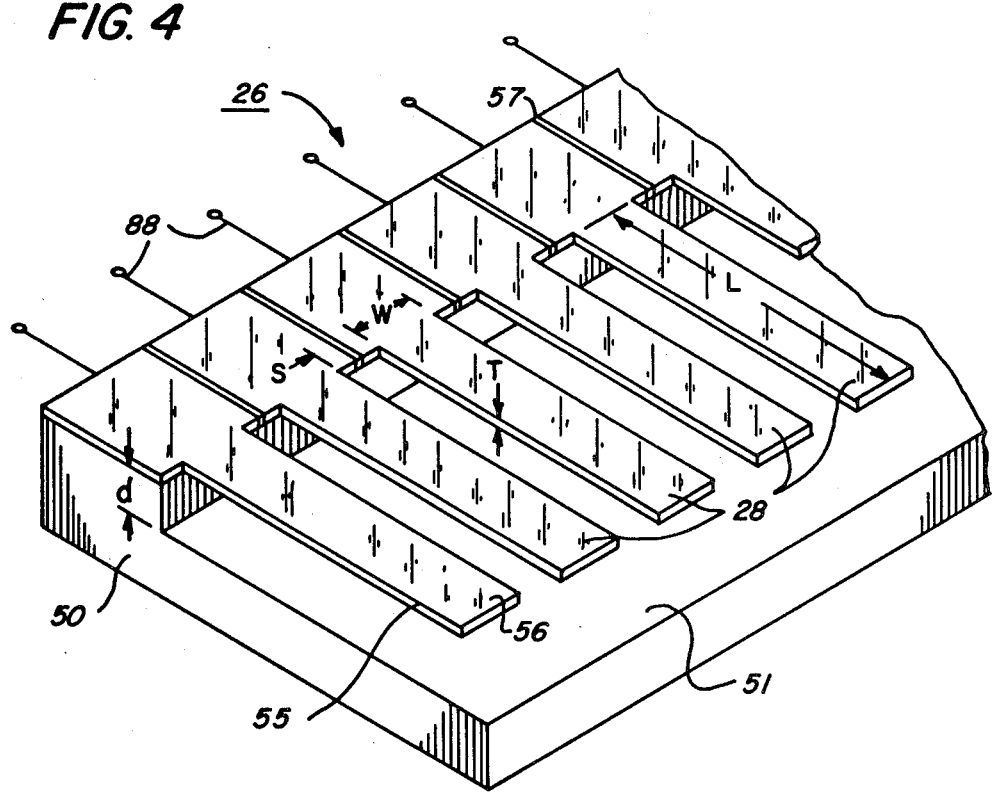
FIG. 4 is an enlarged isometric view of the modulator shown in FIG. 3.

Referring particularly to FIGS. 3 and 4 of the drawings, electromechanical modulator 26 has an elongated generally rectangular base 50 which may for example comprise a silicone chip. The thickness of base 50 is reduced at 51 to permit bending or arcing of reflector fingers 28, which in turn comprise elongated flexible wafers or membranes secured to base 50 in closely spaced side by side relation at the finger end 53. As a result, the opposite end 54 of reflector fingers 28 projects outwardly in cantilever fashion above the reduced thickness section 51 of base 50. Preferably, reflector fingers 28 each comprise a relatively thin flexible silicone dioxide substrate 55, the outer surface of which is covered with a conductive highly reflective coating or layer 56 which may for example comprise chromium. Fingers 28 are insulated from one another as by gaps 57 in the conductive layer 56 between adjoining fingers. A modulator 26 having some 3000 reflector fingers 28 with a length (L) a 100 μm, a width (W) of 50 μm, and a thickness (T) of 0.25 μm, and spaced apart by a distance (S) of 5 μm, has been found suitable. As will be understood, the operating length of the modulator 26, that is, the overall length of the array of reflector fingers 28 is at least equal to the maximum width of the image to be produced. For example, where an 8½ by 11 inch image is to be processed, the overall length of the array of reflector fingers 28 on base 50 would be at least 8½ inches, presuming that images are processed on photoreceptor 12 lengthwise. If image processing is performed in the crosswise direction, the overall length of the array of fingers 28 is at least 11 inches.

Reflector fingers 28 respond to the imposition of a voltage across base 50 and the conductive layer 56 thereof, the resulting electrostatic force causing the reflector finger 28 to which the voltage is applied to bend or deflect downwardly (as shown by the dotted lines in FIG. 3). The degree of bending or deflection obtained is dependent upon the voltage applied, and has been found to increase with increases in voltage up to a predetermined maximum. Typically, a maximum deflection of approximately 5° may be realized by the application of approximately 15 volts, the bending frequency of the cantilevered reflector fingers 28 being approximately 23 KHz. As a result, the direction in which light striking the reflective upper layer 56 of fingers 28 is reflected may be controlled by controlling the voltage applied to the individual reflector fingers 28.

Figure 5:
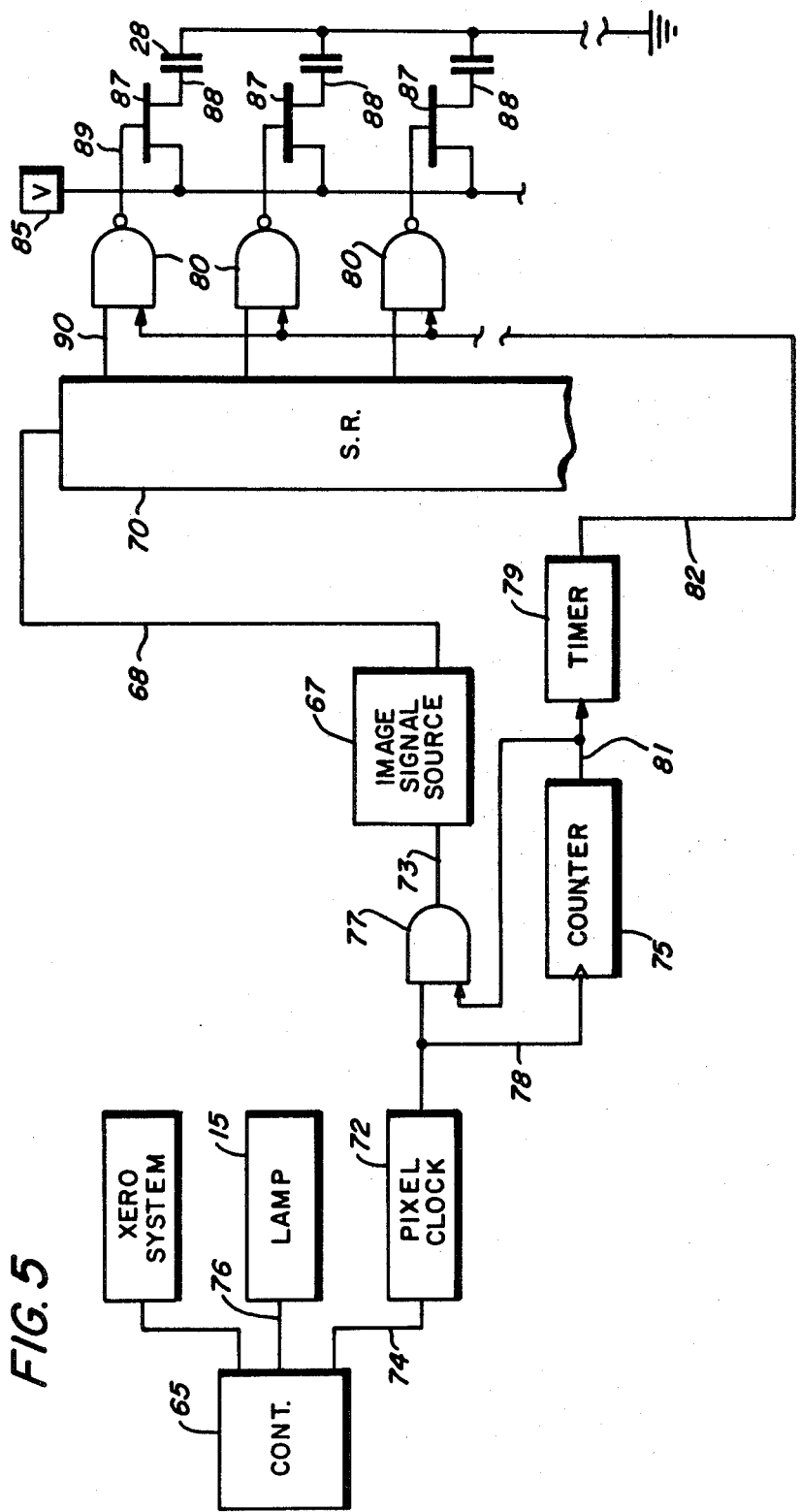
FIG. 5 is a logic schematic of the control system for the output scanner shown in FIG. 1.

Referring to the control schematic shown in FIG. 5 of the drawings, a suitable control module 65 is provided for operating scanner 10. Image signals representing the image to be reproduced by scanner 10 are derived from a suitable image signal source, designated by the numeral 67 herein. As will be understood, image signal source 67 may comprise any suitable source of image signals such as a memory, communication channel, raster input scanner, etc. The output side of image signal source 67 is coupled by line 68 to the input of a suitable serial to parallel shift register 70. A suitable pixel clock 72 is provided for clocking out image signals from image signal source 67 to shift register 70, the output of pixel clock 72 being coupled to image signal source 67 by clock lead 73 through AND function gate 77. Output of clock pulses by clock 72 is controlled by a control signal output by control module 65 through lead 74.

Control module 65 controls energization of lamp 15 through lead 76. To control loading of image signals from image signal source 67 into shift register 70, a suitable counter 75 is provided, counter 75 being driven by clock pulses output by pixel clock 72 through clock line 78. The output side of counter 75 is coupled by line 81 to a second input of gate 77 and to the input terminal of a suitable exposure interval timer 79. The output side of timer 79 is coupled to one input of exposure control gates 80 by line 82.

A suitable deflecting voltage source 85 is provided for bending reflector fingers 28, voltage source 85 being coupled to the array of reflector fingers 28 through control gates 87 and lines 88. Base 50 of deflector array 26 is grounded. The control terminals of individual gates 87 are coupled to the output sides of exposure control gates 80 through lines 89. The individual output stages of shift register 70, which equal the number of image signals that comprise an image line, are coupled by lines 90 to a second input of exposure control gates 80.

Operation

In operation, a control signal from control module 65 actuates the xerographic system associated with scanner 10 thereby initiating movement of photoreceptor 12 past imaging station 40. At the same time, a signal from control module 65 energizes lamp 15 and pixel clock 72. At this point, a voltage from voltage source 85 is applied across the array of reflector fingers 28 of modulator 26 through control gates 87 to cause fingers 28 to bend to the dotted line position shown in FIG. 3. As a result, the light beam 19 emitted by fiber optic bundle 17 is reflected in total by the array of fingers 28 as a first order beam 35 against beam stop 42.

The pixel clock pulses output by clock 72 clock image signals from image signal source 67 into shift register 70, the image signals passing serially through the shift register stages. At the same time, the clock pulses from clock 72 toll a count on counter 75. On reaching a preset count equal to the number of image signals that comprise a line, a signal from counter 75 disables gate 77 to temporarily terminate the input of pixel clock pulses to image signal source 67. At the same time, the signal from counter 75 triggers timer 79 to apply an enabling signal to exposure control gates 80 for a preset exposure interval.

Where the potential of the image signals at the output of the individual shift register stages is relatively low (i.e. a binary 0), the state of the control gate 87 associated therewith remains unchanged. As a result, the voltage from voltage source 85 continues to be applied to the reflector fingers 28 coupled thereto, the electrostatic force holding the fingers in the bent or arced position shown by the dotted lines of FIG. 3. Accordingly, light rays 19' striking the reflector fingers of modulator 26 in this condition continue to be reflected along the path of first order beam 35 and impinge against beam stop 42.

Where the image signals at the output of the individual shift register stages is relatively high, (i.e. a binary 1), the exposure control gate 80 associated therewith is triggered to de-actuate the associated control gate 87 and interrupt the application of voltage from voltage source 85 to the reflector finger 28 associated therewith. With the termination of the electrostatic force, the finger springs back to the straight or level position shown by the solid lines of FIG. 3. Light rays 19' impinging against any of the now undeflected fingers 28 are reflected along the zero beam path 34 to lens array 37, and through lens array 37 to exposure station 40 and photoreceptor 12. The application of light to photoreceptor 12 at exposure station 40 discharges the photoreceptor with the result that a latent image line comprised of charged and discharged photoreceptor areas is created in accordance with the image signal content.

Following a preset exposure interval, timer 79 resets to disable exposure control gates 80 and permit application of voltage from voltage source 85 across the entire array of reflector fingers 28. As a result, the light beam 19 emitted by fiber optic bundle 17 is reflected by modulator 26 along the path of first order beam 35 and against beam stop 42 pending loading of shift register 70 with the next line of image signals and movement of photoreceptor 12 forward one line.

It will be understood that the aforedescribed logic control system is exemplary only and other systems for operating modulator 26 to selectively expose an imaging member in response to an image signal input may instead be envisioned. And while light reflected by reflector fingers 28 of modulator 26 when in an undeflected condition (i.e. zero order beam 34) is illustrated as comprising the exposure beam for exposing imaging member 12, reflected light from fingers 28 when in a deflected condition may instead be used to expose the imaging member.

While the invention has been described with reference to the structure disclosed, it is not confined to the details set forth, but is intended to cover such modifications or changes as may come within the scope of the following claims.

We claim:
1. An image output scanner comprising in combination:
   (a) a source of high intensity radiation;
   (b) means for converting radiation from said radiation source to a plurality of individual radiation beams;
   (c) an array of flexible reflectors, the number of said reflectors being at least equal to the number of said radiation beams,
   said reflector array being disposed in the path of said radiation beams so that individual ones of said radiation beams impinge against individual ones of said reflectors whereby said reflectors individually reflect said radiation beams along a first path when said reflectors are undeflected and along a second path when said reflectors are deflected;
   (d) an imaging member on which images are created through selective exposure by said radiation beams;
   (e) a lens array for transmitting individual radiation beams reflected by said reflectors along one of said first and second paths to said imaging member to expose said imaging member and create images thereon; and
   (f) means to deflect said reflectors individually in response to an image signal input whereby to selectively impinge said radiation beams against said imaging member to expose said imaging member and create images represented by said image signals on said imaging member.

2. The scanner according to claim 1 in which said radiation converting means comprises a fiber optic bundle.

3. The scanner according to claim 1 in which said reflector array includes a substrate, a portion of said substrate being recessed, each of said reflectors being supported on said substrate so that at least the portion of said reflector against which said radiation beam impinges extends across said substrate recessed portion is spaced relation to said substrate,
   each of said reflectors being composed of abutting insulated and conductive layers, establishment of a potential across said reflector conductive and insulated layers causing the portion of said reflector over said substrate recessed portion to deflect,
   said means to deflect said reflectors including means for selectively placing said potential across said conductive and insulated layers of said reflectors in response to said image signal input.

4. The scanner according to claim 3 in which each of said reflectors is supported on said substrate at one end with the remainder of said reflector including the reflector opposite end extending across said substrate recessed portion in cantilever fashion.

5. The scanner according to claim 4 in which said reflector conductive layer is comprised of a radiation reflective material to enhance optical efficiency.

6. The scanner according to claim 1 in which said lens means comprises a bundle of individual lens fibers, there being at least one lens fiber associated with each of said radiation beams.

7. The scanner according to claim 6 in which said lens fibers comprise selfoc lenses.

8. An image output scanner comprising in combination:
   (a) a source of high intensity light;
   (b) means for converting said light to a linear array of individual light beams;

(c) a plurality of flexible reflectors arranged to form a linear array, the number of said reflectors being at least equal to the number of said light beams, said reflector array being disposed in the path of said light beams so that individual ones of said light beams impinge against individual ones of said reflectors whereby said reflectors individually reflect said light beams along a first path when said reflectors are undeflected and along a second path when said reflectors are deflected;

(d) a movable imaging member on which images are created through selective exposure by said light beams;

(e) a linear array of lens elements for transmitting individual light beams reflected by said reflectors along one of said first and second paths to said imaging member to expose said imaging member line by line and create images thereon; and (f) means to deflect said reflectors individually in response to image signals whereby to selectively impinge individual ones of said linear array of light beams against said imaging member in accordance with said image signals whereby to expose said imaging member and create images represented by said image signals on said imaging member.

9. The scanner according to claim 8 in which said radiation converting means comprising a linear array of fiber optic elements.

10. The scanner according to claim 9 in which said reflector array includes a substrate, a portion of said substrate being recessed, each of said reflectors being supported on said substrate so that at least the portion of said reflector against which a light beam impinges extends across said substrate recessed portion, each of said reflectors being composed of overlaying insulated and conductive layers, establishment of a preset potential across said reflector conductive and insulated layers causing the portion of said reflector over said substrate recessed portion to deflect, said deflect means including means for selectively placing said preset potential across said reflector conductive and insulating layers in response to said image signals.

11. The scanner according to claim 10 in which each of said reflectors are supported on said substrate at one end with the remainder of said reflector including the reflector opposite end extending across said substrate recessed portion in cantilever fashion.

12. The scanner according to claim 11 in which said reflector conductive layer is comprised of a radiation reflective material to enhance optical efficiency.

* * * * *